(12) United States Patent
Roberts (10) Patent No.: US 7,762,830 B2
(45) Date of Patent: Jul. 27, 2010

(54) CONNECTOR FOR A THERMAL CUTTING SYSTEM OR WELDING SYSTEM

(75) Inventor: Jesse A. Roberts, Cornish, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 12/035,117

(22) Filed: Feb. 21, 2008

(65) Prior Publication Data

US 2009/0215302 A1    Aug. 27, 2009

(51) Int. Cl.
*H01R 13/627* (2006.01)

(52) U.S. Cl. ...................................... 439/350

(58) Field of Classification Search ............... 439/350, 439/192, 181; 219/121.51
See application file for complete search history.

(56) References Cited

U.S. PATENT DOCUMENTS

| | | | |
|---|---|---|---|
| 3,996,546 A | 12/1976 | Hugly | 336/107 |
| 4,131,805 A | 12/1978 | Austin et al. | 307/147 |
| 4,270,824 A | 6/1981 | Erickson | |
| 5,074,802 A * | 12/1991 | Gratziani et al. | 439/192 |
| 5,208,436 A | 5/1993 | Blankenship | |
| 5,624,586 A * | 4/1997 | Sobr et al. | 219/121.48 |
| 6,049,142 A | 4/2000 | Wakefield | 307/75 |
| 6,472,631 B1 | 10/2002 | Eickhoff et al. | 219/121.39 |
| 6,683,273 B2 * | 1/2004 | Conway et al. | 219/121.51 |
| 6,699,052 B1 | 3/2004 | Poran | 439/172 |
| 6,713,711 B2 * | 3/2004 | Conway et al. | 219/121.48 |
| 6,720,527 B2 | 4/2004 | Gadamus et al. | 219/130.1 |
| 6,852,943 B2 * | 2/2005 | Eickhoff et al. | 219/121.48 |
| 7,176,404 B2 | 2/2007 | Herres | 219/121.5 |
| 7,288,740 B2 | 10/2007 | Radtke | 219/130.1 |
| 2002/0190042 A1 | 12/2002 | Gadamus et al. | 219/130.1 |

FOREIGN PATENT DOCUMENTS

| | | |
|---|---|---|
| EP | 0 315 924 | 5/1989 |
| WO | 2006/060268 | 6/2006 |

* cited by examiner

*Primary Examiner*—Jean F Duverne
(74) *Attorney, Agent, or Firm*—Proskauer Rose LLP (57) ABSTRACT

A connector assembly for a thermal cutting system or welding system can include a housing having a locking device. The locking device can cause, upon application of a translational force, engagement of the connector assembly relative to a stationary receiving mechanism and can cause, upon application of a force on a contact member or a rotational moment on the contact member, disengagement of the locking device relative to the stationary receiving mechanism. The connector assembly can include a conduit disposed in the housing, the conduit carrying a gas to the thermal cutting system or welding system. The connector assembly can include a first current carrying member disposed in the housing, the first current carrying member carrying an operating current to the thermal cutting system or welding system and a second current carrying member disposed in the housing, the second current carrying member carrying a second current.

29 Claims, 9 Drawing Sheets

CONNECTOR FOR A THERMAL CUTTING SYSTEM OR WELDING SYSTEM

FIELD OF THE INVENTION

This invention generally relates to a connector assembly for a thermal cutting system or welding system. More specifically, the invention relates to a connector assembly for a plasma arc system or a welding apparatus.

BACKGROUND OF THE INVENTION

Welding and plasma arc torches are widely used in the welding, cutting and marking of materials. A plasma torch generally includes an electrode and a nozzle having a central exit orifice mounted within a torch body, electrical connections, passages for cooling, passages for arc control fluids (e.g., plasma gas), and a power supply. Optionally, a swirl ring is employed to control fluid flow patterns in the plasma chamber formed between the electrode and nozzle. The torch produces a plasma arc, a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be by means of a high frequency, high voltage signal coupled to a DC power supply and the torch or any of a variety of contact starting methods.

A torch assembly includes one or more leads connecting the torch to the power supply to provide the torch with electrical current and fluid. A similar configuration can be used with a welding apparatus. The engagement of the lead(s) to the power supply should be rugged to handle the stress and/or the strain placed on the lead as it is manipulated to place the plasma arc torch or welding torch in a position to cut, mark, or weld a workpiece. The lead(s) used to connect the torch to the power supply can be a single integral lead having a fluid hose, for example, a gas hose located in the middle of the lead and electrical conductors and fillers arranged symmetrically around the gas hose.

Plasma and welding equipment is comprised of two main components, the torch assembly and the power supply assembly. The torch is usually affixed to the power supply using one of two methods. In the first method, the torch is plumbed inside the unit and can only be changed by using a tool to enter the power supply. In the second method, the torch is attached to the power supply via a detachable connector. A detachable connector offers several advantages. First, it is simple to exchange hand and machine style torches. Second, it is easy to repair a damaged torch. Third, it may be more convenient to store a detached torch separate from the power supply.

Existing connections for connecting leads to the power supply can have any of several limitations. Some lead connections require large access areas which impact power supply size. Certain connectors must be visible to enable engagement and/or disengagement, which impacts lead placement, space, can necessitate lighting and can increase the time required to engage and disengage the lead connectors. Other connectors require the operator to use two hands to complete the engagement and/or disengagement. Adequate space around the power supply and the leads must be available to enable two hands to access the connection. Some known connections require use of one or more tools to enable engagement and/or disengagement. The use of the tool can be time consuming, the tool can be easily misplaced, and space must be available on the power supply and/or adjacent the connector to accommodate the tool. Threaded connector fittings can be incorrectly installed and tightened causing wear and/or leaking. Certain connectors and/or leads leak after multiple or frequent engagements and disengagements. Previous lead connectors required multiple wrench connections, which is time consuming. Replacement of the lead set in the field is challenging and time consuming due to the limitations of these prior systems.

Existing designs in torch connector technology often rely upon a nut to couple the torch plug onto the power supply socket. Nuts have the advantage of being easy to make, easy to use, while having a high retention force. The disadvantage of the nut is that it takes some time to thread and unthread, may require two hands, and adds bulk to the connector. A less common alternative connector design utilizes common pneumatic and electrical components. This has the advantage of using off the shelf components. A disadvantage of this coupler is that it is unnecessarily bulky, awkward to disconnect, and expensive to mold.

Another disadvantage of current torch connector designs is that the mating structure protrudes from the power supply. Designs incorporating a nut to couple the torch plug onto the power supply requires a threaded socket extending from the power supply. Such designs are not aesthetically pleasing and create additional protrusions from a power supply. Outwardly protruding sockets are also susceptible to damage, resulting in expensive repairs. Moreover, in order to be coupled, a nut must inherently be larger than a socket, requiring that the attached torch plug create an even larger footprint than the socket alone. Also, the nuts require sufficient clearance around the circumference to be hand threaded onto the socket. The space available to rotate a nut is increasingly limited as the size of power supplies become smaller and smaller.

SUMMARY OF THE INVENTION

Advantages of the different aspects and embodiments as described herein can include, for example, an intuitive connector that is easy to align and connect, as compared to previous designs. In some aspects and/or embodiments, the connector is compact and can require limited receiving space for the connector, as compared to previous designs. As described herein, a corresponding connector may be referred to as a corresponding receiving connector. A housing may be referred to as a housing wall, supportive structure, or any combination thereof. A locking device may be referred to as a locking mechanism, a resilient member, or any combination thereof. A stationary receiving mechanism may be referred to as a feature of a substantially static receiving mechanism. A current carrying member may be referred to as a pin that can carry a current, a signal carrying member, or any combination thereof. A conduit may be referred to as a gas carrying member. A key shaped feature may be referred to as an alignment feature, alignment geometry or any combination thereof.

The invention, in one aspect, includes a connector assembly for a thermal cutting system or welding system. The connector assembly can include a housing including a locking device. The locking device can cause, upon application of a translational force, engagement of the connector assembly relative to a stationary receiving mechanism. The locking device can cause, upon application of a force on a contact member or a rotational moment on the contact member, disengagement of the locking device relative to the stationary receiving mechanism. The connector assembly can include a conduit disposed in the housing, the conduit carrying a gas to the thermal cutting system or welding system. The connector assembly also can include a first current carrying member disposed in the housing, the first current carrying member carrying an operating current to the thermal cutting system or welding system. The connector assembly can also include a second current carrying member disposed in the housing, the second current carrying member carrying a second current.

The invention, in another aspect, includes a method for connecting and disconnecting a connector assembly associated with a thermal cutting system or welding system to a substantially static receiving mechanism. The method can include applying a translational force to the connector assembly to engage a resilient member of the connector assembly with a feature of a substantially static receiving mechanism. The method also can include applying a force on a contact member of the connector assembly in mechanical communication with the resilient member to disengage the resilient member from the feature.

The invention, in another aspect, includes a plasma torch connector for a plasma arc torch. The plasma torch connector can include a housing wall and a locking mechanism extending from the housing wall. The connector can also include a gas carrying member extending from an end face disposed relative to the housing wall, a current carrying member extending from the end face disposed relative to the housing wall and a signal carrying member extending from the end face disposed relative to the housing wall. The connector can also include an alignment feature orienting the connector relative to a corresponding receiving connector.

The invention, in another aspect, includes a plasma torch connector for a plasma arc torch. The plasma torch connector can include a housing wall and a locking mechanism extending from an external surface of the housing wall. The plasma torch connector can also include a gas carrying member extending from an end face disposed relative to the housing wall, a current carrying member extending from the end face disposed relative to the housing wall and a signal carrying member extending from the end face disposed relative to the housing wall. The plasma torch connector can also include an alignment feature orienting the connector relative to a corresponding receiving connector.

The invention, in yet another aspect, includes a connector for a torch. The connector can include a supportive structure, a conduit disposed in the supportive structure and adapted to carry a gas to the torch. The connector also can include a means for carrying a cutting current to the torch, a means for carrying at least one of a pilot current or a signal current, a means for slideably locking the supportive structure to a corresponding receiving means and a means for disengaging the supportive structure to the corresponding receiving means.

The invention, in another aspect, includes a connector device for a plasma arc torch system. The connector device can include a housing that can include a means for locking out differently rated torches. The connector device can include a conduit disposed in the housing, the conduit carrying at least one of a gas or a current to the plasma arc torch system; and a pin disposed relative to the conduit, the pin carrying a second current to the plasma arc torch system.

In other examples, any of the aspects above, or any apparatus or method described herein, can include one or more of the following features.

In some embodiments, a connector assembly also includes a corresponding connector assembly disposed on a power supply for mating with the connector assembly. The corresponding connector assembly includes the stationary receiving mechanism, a passage configured to carry the gas from the power supply to the thermal cutting system or welding system, a first socket configured to carry the first current and mate with the first current carrying member associated with the connector assembly and a second socket configured to carry the second current and mate with the second current carrying member associated with the connector assembly.

The connector assembly can be disposed on a plasma arc torch. In some embodiments, the connector assembly is disposed on a power supply. The thermal cutting system or welding system can be a plasma system.

In some embodiments, the first current is a cutting current for a plasma arc torch system. In some embodiments, the locking device is a resilient latch. In some embodiments, the resilient latch causes, upon application of a translational force, engagement relative to the stationary receiving mechanism. In some embodiments, the contact member is associated with the connector assembly and is in mechanical communication with the resilient latch, the contact member causing, upon application of a force, disengagement of the resilient latch with the stationary receiving mechanism.

In some embodiments, the connector assembly includes a mechanical lockout feature disposed relative to the housing. In some embodiments, the connector assembly includes a second mechanical lockout feature configured to mate with the mechanical lockout feature disposed relative to the housing.

A key shaped feature can be disposed relative to the housing. In some embodiments, a second key shaped feature is disposed relative to a corresponding connector assembly, the second key shaped feature configured to mate with the key shaped feature disposed relative to the housing.

In some embodiments, the connector assembly is an adaptor for connecting a plasma arc torch to the stationary receiving mechanism, the stationary receiving mechanism disposed relative to a power supply. The housing of the connector assembly can include a first end including the locking device and a second end capable of mating with the plasma arc torch.

In some embodiments, the operating current is a cutting current or a welding current. The thermal cutting system or welding system can be a plasma arc torch.

In some embodiments, a substantially static receiving mechanism is disposed relative to a power supply.

In some embodiments, a locking mechanism extends orthogonally from a longitudinal axis of a housing wall. The locking mechanism can extend radially from a longitudinal axis of the housing wall. In some embodiments, a housing wall of a plasma torch connector is substantially circular and the alignment feature is a key shaped feature on the housing wall. A gas carrying member can be substantially disposed in the center of the substantially circular housing wall. In some embodiments, the current carrying member is the same member as the gas carrying member. The signal carrying member can carry a pilot current and can be disposed relative to the gas carrying member.

In some embodiments, a connector (e.g., plasma torch connector) can include a lockout feature. In some embodiments, a connector includes a means for locking out torches having improper power capacities. In some embodiments, the means for locking out differently rates torches is a molded feature having a length that correlates to a selected current rating.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
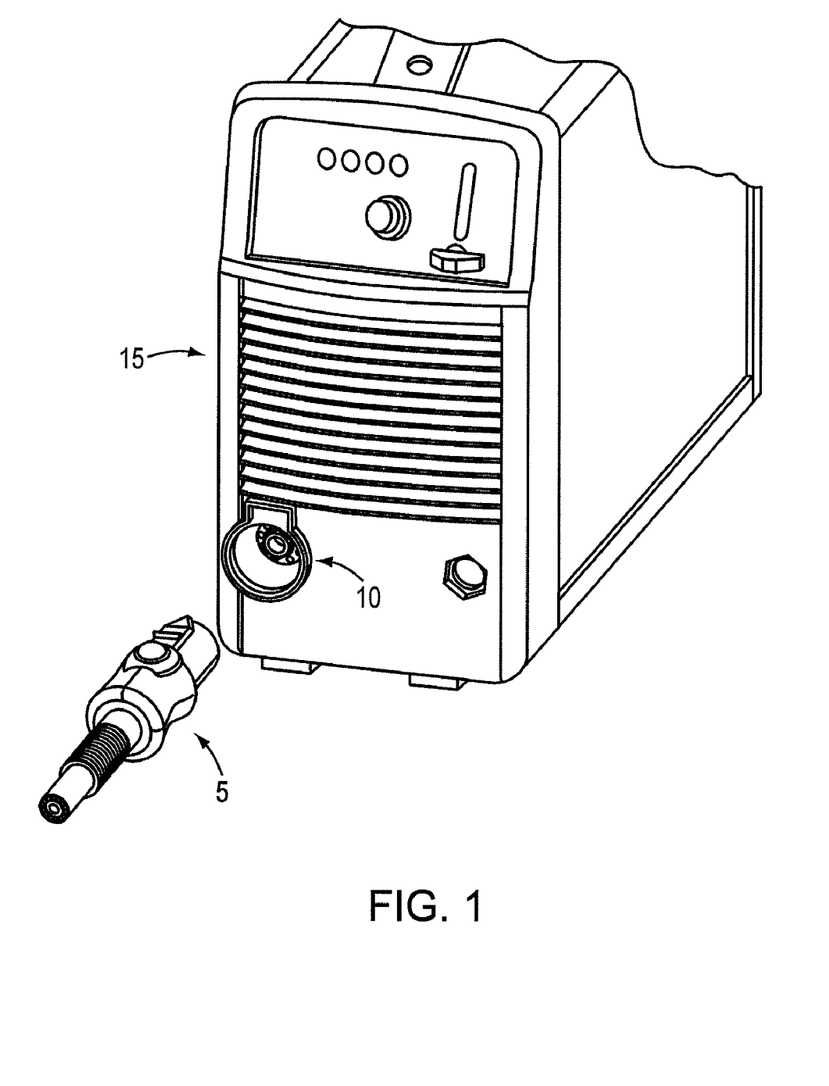
FIG. 1 is a drawing of a connector assembly and a corresponding connector assembly, according to an illustrative embodiment.

FIG. 1 is a drawing of a connector assembly 5, according to an illustrative embodiment. The connector assembly 5, which in some embodiments may simply be a connector, can be associated with and/or disposed relative to a torch for a thermal cutting system or welding system, such as a plasma arc system or a welding apparatus. The connector assembly 5 is configured to carry a gas and a current to the thermal cutting system or welding system (e.g., a plasma arc cutting torch, not shown) and mate with a corresponding connector assembly 10. In some embodiments, the corresponding connector assembly 10 is a socket disposed relative to a power and/or gas supply 15. The connector assembly 5 can slideably lock and mates with the corresponding connector assembly 10. The connector assembly 5 can disengage with a single actuation movement. In some embodiments, connector assembly 5 can be disposed relative to a power and/or gas supply 15 and the corresponding connector assembly 10 is disposed relative to a torch for a thermal cutting system or welding system.

Figure 2:
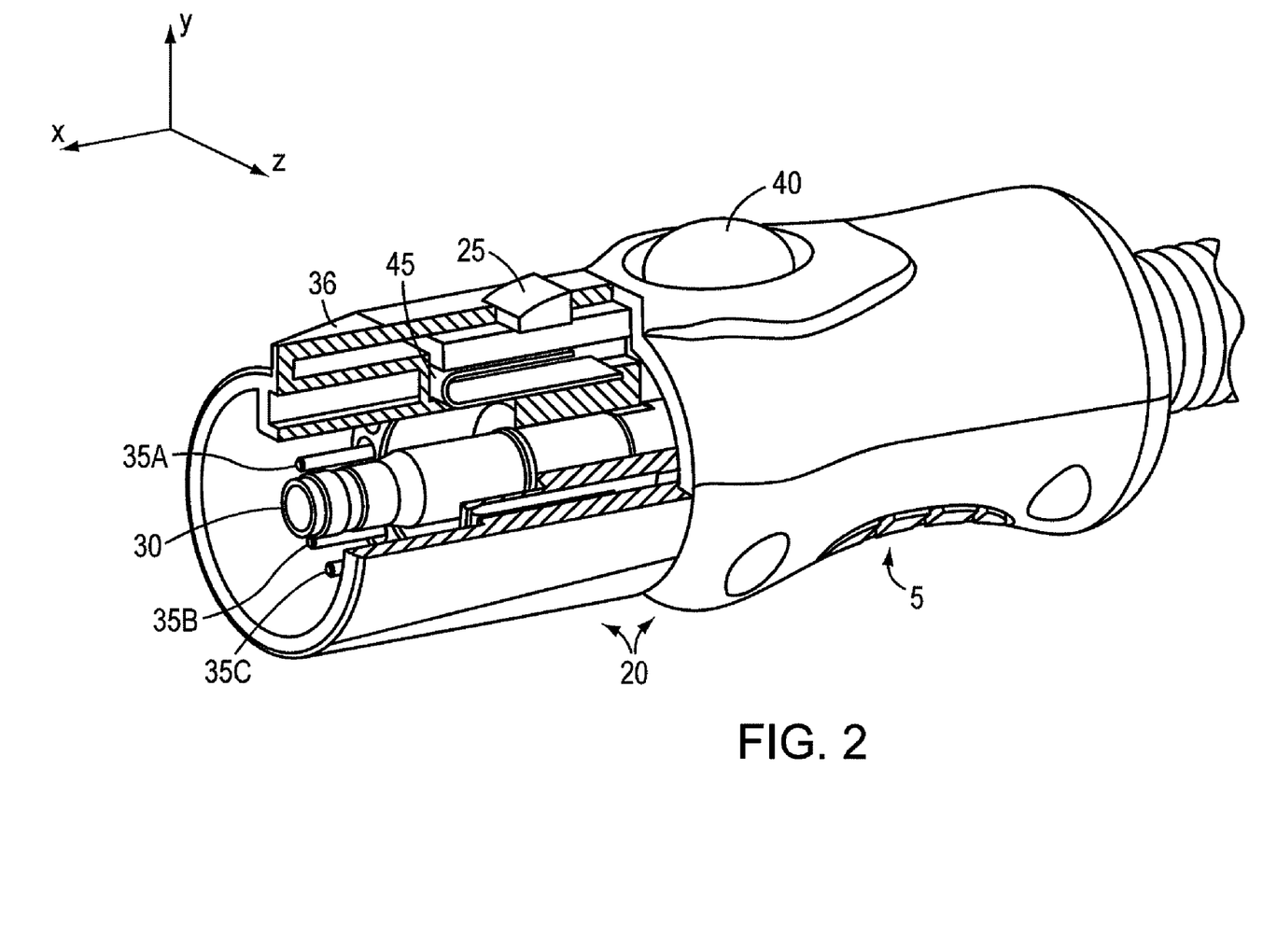
FIG. 2 is a cut away view of a connector assembly, according to an illustrative embodiment.

FIG. 2 is a cut away view of a connector assembly 5, according to an illustrative embodiment. The connector assembly 5 includes a housing 20, or a similar supportive structure, having a locking device 25. The connector assembly 5 also includes a conduit 30 (e.g., a conduit disposed in the housing 20) or other similar gas conveyance member, disposed in the housing 20. The conduit 30 can carry at least one of a gas or a current to a thermal cutting system or welding system. The connector assembly 5 includes at least one current carrying member (e.g., pin) 35A, 35B or 35C capable of carrying a current to the thermal cutting system or welding system (e.g., a cutting current, a pilot current, welding current or a signal current such as a trigger or safety mechanism). The current carrying member can be disposed in the housing 20.

In this embodiment, current carrying members 35A, 35B or 35C are pins that can carry a current. In some embodiments, the current is an operating current that can be used to cut or weld in a thermal cutting system or welding system. In some embodiments, a contact member 40 is disposed relative to the housing 20 and is used for disengagement of the connector assembly 5.

In this embodiment, the connector assembly 5 is disposed relative to a thermal cutting system or welding system, such as a plasma arc system or welding apparatus. In other embodiments, the connector assembly 5 is disposed relative to a power and/or gas supply for a thermal cutting system or welding system.

The housing 20 can be a dielectric material. In some embodiments, the locking device 25 disposed on the housing 20 is a resilient latch. The latch can be in mechanical communication with a spring 45. In some embodiments, the contact member 40 is in mechanical communication with the latch. In some embodiments, an application of a force on the contact member 40 causes a displacement of the spring loaded latch, permitting disengagement of the connector assembly 5. In some embodiments, application of a force on the contact member 40 causes disengagement of the resilient latch from a stationary receiving mechanism.

The conduit 30 can carry at least one of a gas and a current to the thermal cutting system or welding system. The conduit 30 can be a positive pressure gas line that can be separate from but centrally located in the housing 20. In some embodiments, the thermal cutting system or welding system is a plasma arc torch system and the conduit 30 is an electrical connector that can carry a torch current. In some embodiments, the conduit 30 carries a current that is sufficient to cut a metal. In some embodiments, the connector assembly 5 includes a plurality of current carrying members 35A, 35B, or 35C disposed relative to the conduit 30. The current carrying members 35A, 35B, or 35C can carry pilot current to a plasma arc torch system. In some embodiments, current carrying members 35A, 35B or 35C carry an operating current to the corresponding connector assembly. In some embodiments, at least one of current carrying members 35A, 35B, or 35C is a shorter current carrying member relative to the other current carrying members, acting as an electrical shut off to prevent arcing upon abrupt disconnect.

In some embodiments, the connector assembly 5 includes a housing 20 (e.g., housing wall) that has a longitudinal axis along the x-axis. The locking device 25 (e.g., locking mechanism) can be oriented radially or orthogonally from the longitudinal axis. In some embodiments, the locking device 25 extends from the housing 20 or extends from an external surface of the housing 20. At least one of the conduit 30 (e.g., gas carrying member), current carrying member 35A, 35B, or 35C can extend from an end face disposed relative to the housing 20. In some embodiments, a current carrying member 35A, 35B or 35C can be a signal carrying member. In some embodiments, the connector assembly 5 includes an alignment feature 36 (e.g., key shaped feature) orienting the connector assembly 5 relative to a corresponding receiving connector. The alignment feature 36 can be a keyshaped feature on the housing 20. In some embodiments, the housing 20 is substantially circular.

Figure 3A:
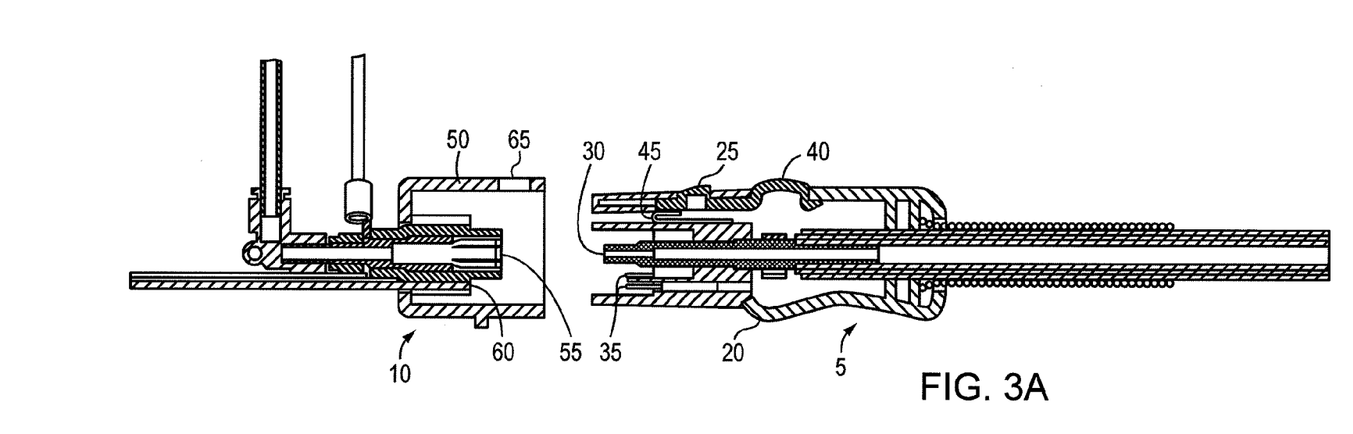
FIG. 3A shows a cross section of a connector assembly disengaged with an corresponding connector assembly, according to an illustrative embodiment.

FIG. 3A shows a cross section of a connector assembly 5 and a corresponding connector assembly 10 (e.g., corresponding receiving connector), according to an illustrative embodiment. The connector assembly 5 is configured to engage with the corresponding connector assembly 10. The connector assembly 5 mates with the corresponding connector assembly 10 such that the housing 20, conduit 30 and current carrying members 35A, 35B, or 35C (e.g., pins) are functionally engaged with the corresponding features in the corresponding connector assembly 10. The corresponding connector assembly 10 includes a feature 50 adapted to receive the housing of the connector assembly 20, a feature 55 adapted to receive the conduit of the connector assembly 30 and a feature 60 (e.g., a socket) adapted to receive at least one current carrying member of the connector assembly 35A, 35B, or 35C. In some embodiments, the feature 60 can carry a current. In this embodiment, the feature 55 adapted to receive the conduit of the connector assembly 30 is a passage that can carry gas from the power supply to the thermal cutting system or welding system. The corresponding connector assembly 10 can also include a stationary receiving mechanism 65 adapted to receive the locking device 25 disposed relative to the connector assembly 5. The stationary receiving mechanism 65 is "stationary" in that it can be substantially passive during the locking function, such as by providing a fixed structure where the locking mechanism can be latched and/or engaged.

In some embodiments, the locking device 25 is a resilient pin or latch and the stationary receiving mechanism 65 can be a notch feature adapted to receive the pin or latch. In some embodiments, the connector assembly 5 is disposed relative to a torch for a thermal cutting system or welding system and the corresponding connector assembly 10 is disposed relative to a power and/or gas supply for the thermal cutting system or welding system. In some embodiments, the connector assembly 5 is disposed relative to the power and/or gas supply and the corresponding connector assembly 10 is disposed relative to the torch for a thermal cutting system or welding system.

Figure 3B:
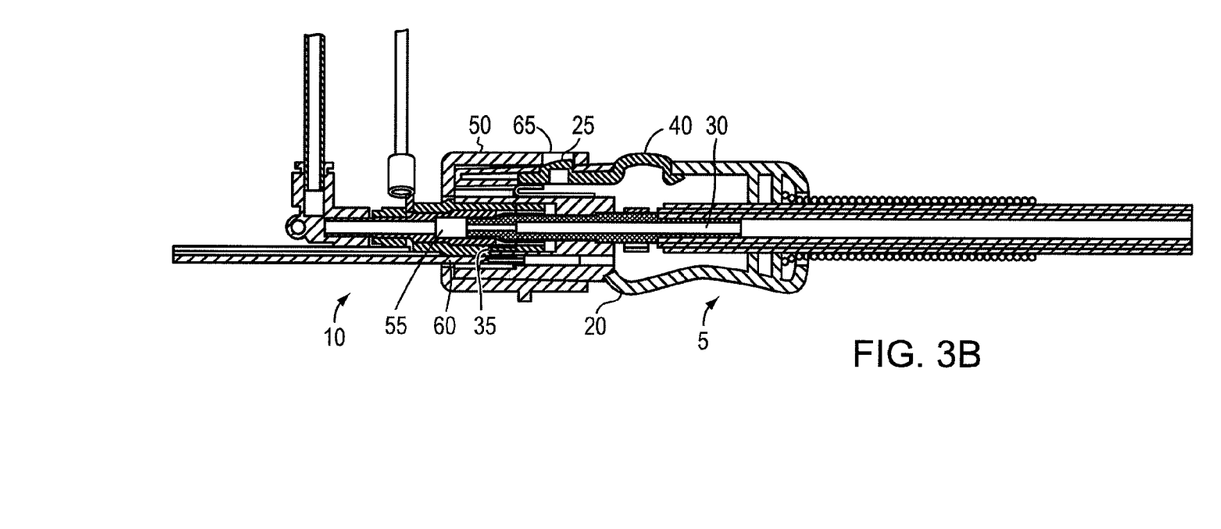
FIG. 3B shows a cross section of the connector assembly of FIG. 3A engaged with the corresponding connector assembly of FIG. 3A.

The housing 20 of the connector assembly 5 includes a locking device 25, causing, upon application of a translational force, engagement of the locking device 25 with the stationary receiving mechanism 65 disposed relative to the corresponding connector assembly 10, as can be seen in FIG. 3B. By way of example only, in some embodiments, a method for connecting and disconnecting a connector assembly 5 associated with a thermal cutting system or welding system to a stationary receiving mechanism 65 (e.g., a substantially static receiving mechanism) can include the step of applying a translational force to the connector assembly 5 to engage a locking device 25 (e.g., resilient member) of the connector assembly 5 with a feature of a stationary receiving mechanism 65 and applying a force on a contact member 40 of the connector assembly 5 in mechanical communication with the locking device 25 to disengage the locking device 25 from the feature of a stationary receiving mechanism 65. In some embodiments, the thermal cutting system is a plasma arc torch system. In some embodiments, the stationary receiving mechanism 65 is disposed relative to a power supply.

In some embodiments, the locking device 25 is a spring-biased latch and the corresponding connector assembly 10 is a socket that includes a stationary receiving mechanism 65 that is a feature adapted to mate with and engage the spring-biased latch. In some embodiments, the connector assembly 5 could have a plurality of locking devices and/or latches, which can limit the amount of ergonomic effort required to make and break a secure connection. The corresponding connector assembly 10 can be a socket affixed to a power supply. In some embodiments, to plug a torch into the power supply, the only effort required is a one handed pushing action. In some embodiments, the locking device 25 is a latch button can be biased by a spring 45 and can move into the detent provided in the socket. In some embodiments, to remove the connector assembly 5 from the corresponding connector assembly 10, the only effort required can be a one handed button press along with a pull action.

The contact member 40 permits, upon application of a force on the contact member 40, disengagement of the connector assembly 5 with the corresponding connector assembly 10, as shown in FIG. 3A. In some embodiments, the contact member 40 is a button that the user can depress or apply an orthogonal action upon, disengaging the locking device 25 from the stationary receiving mechanism 65 and permitting the user to remove the connector assembly 5 from the corresponding connector assembly 10.

In some embodiments, the connector assembly 5 is disposed relative to a thermal cutting system or welding system, such as a plasma arc torch system or a welding apparatus. The corresponding connector assembly 10 can be disposed relative to a gas and/or a power supply. The corresponding connector assembly 10 can have a conduit 55 carrying a gas and/or current and can also have electrical communication paths 60 that carry a current to the thermal cutting system or welding system via current carrying members 35A, 35B or 35C when the connector assembly 5 is engaged with the corresponding connector assembly 10.

Alternative configurations for a connector (e.g., a slideably engaging connector) are contemplated, such as a connector assembly for a torch where the locking device is a latch that is a spring loaded collar that springs over a detent in the power supply (not shown). The latch could be in the form of a rotational collar. The latch could be integrated into to a plug or a socket, for example, with a living hinge.

In some embodiments, a torch may have a connector assembly where the housing includes at least one pin or member acting as a locking device (not shown). In some embodiments, a stationary and/or fixed receiving mechanism disposed on a power and/or gas supply, has a corresponding connector assembly that has a spring loaded collar with a channel on an inner surface of the collar. Upon application of a sliding and/or translational force, the resilient pin can engage with the inner surface of the channel. The channel can be configured so that the spring loaded collar moves to accommodate the connector assembly of the torch as the pin engages with the channel. In some embodiments, the spring loaded collar snaps into place, engaging the torch to the power supply. The spring loaded collar can be a contact member, where a rotational moment about the spring loaded collar, can disengage the pin from the corresponding connector assembly, permitting the user to remove the torch connector from the power supply.

Figure 4A:
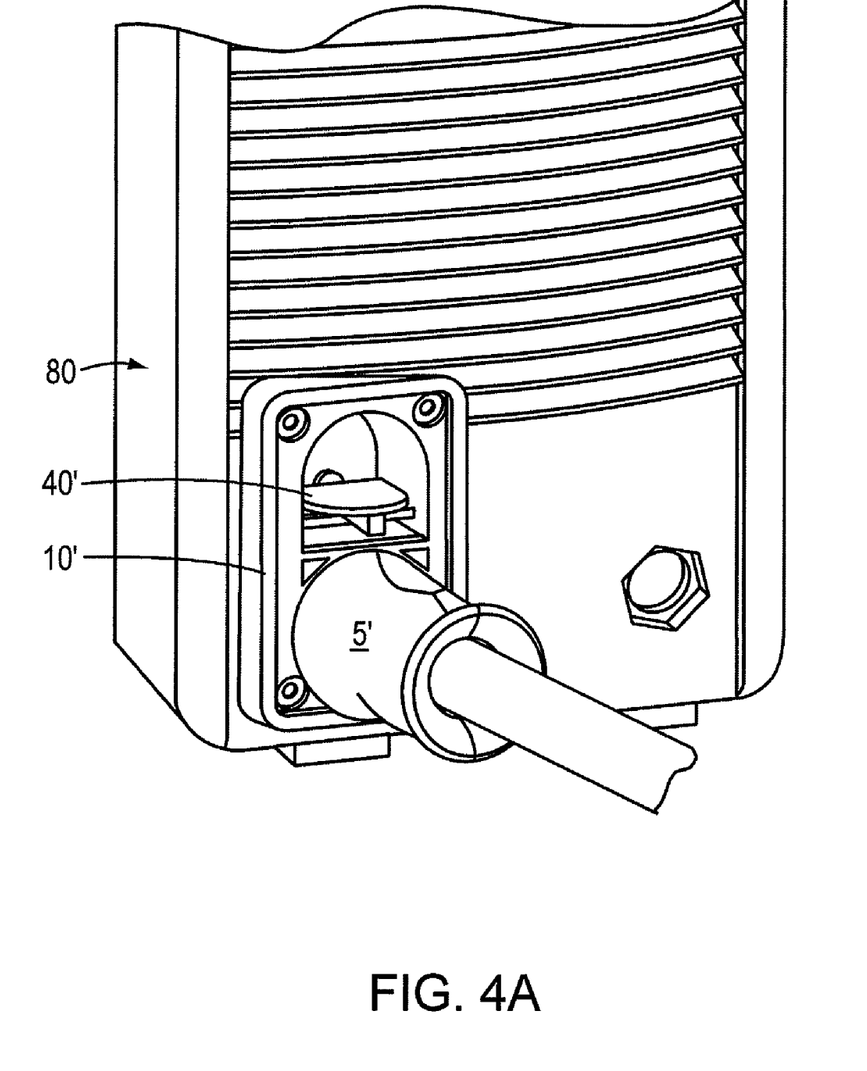
FIG. 4A shows a connector assembly engaged with a corresponding connector assembly, according to another illustrative embodiment.

FIG. 4A is a drawing of a connector assembly 5' engaged with a corresponding connector assembly 10', according to an illustrative embodiment. In this embodiment, the locking device is disposed relative to the corresponding connector assembly 10' that is associated with a power and/or gas supply 80. The locking device causes, upon a translational force upon a connector assembly 5', engagement of the connector assembly 5' with the corresponding connector assembly 10'. A contact member 40' can be disposed relative to the corresponding connector assembly 10'. The contact member 40' can be in mechanical communication with the locking device, causing, upon application of a force on to the contact member 40', disengagement of the connector assembly 5' associated with the thermal cutting system or welding system with the corresponding connector assembly 10'.

Figure 4B:
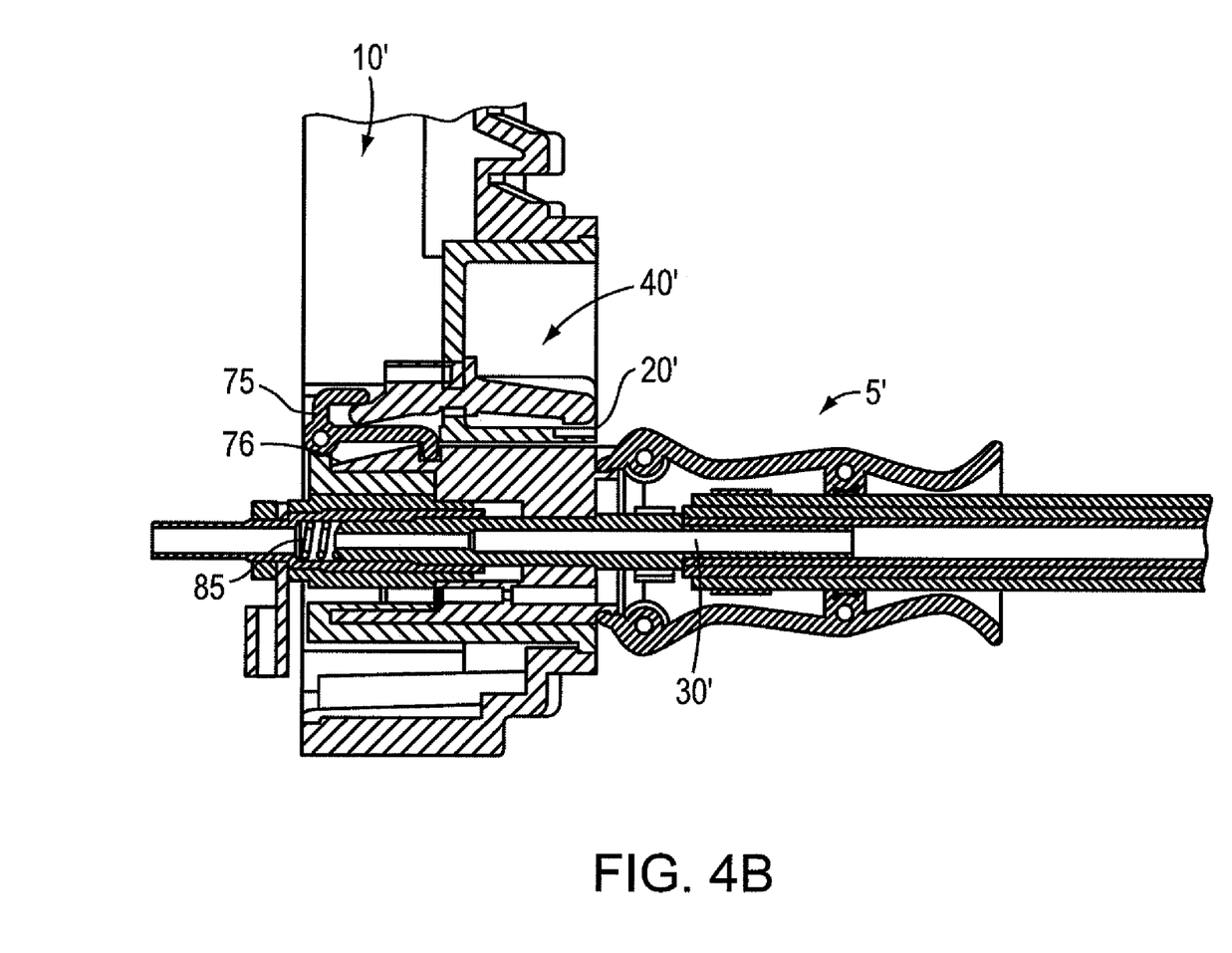
FIG. 4B shows a cross section of the connector assembly of FIG. 4A engaged with the corresponding connector assembly of FIG. 4A.

Different latch embodiments can be used with a pneumatic and/or electric connector that require minimal ergonomic effort. For example, as shown in FIG. 4B, a connector assembly 5' includes a conduit 30' adapted to carry both a gas and/or a current to a corresponding connector assembly 10' which can be associated with a gas and/or power supply. The connector assembly 5' can include at least one current carrying member (not shown) disposed relative to the conduit 30'. In some embodiments, the connector assembly 5' is disposed relative to a torch for a thermal cutting system or welding system such as plasma arc torch or welding apparatus. In some embodiments, a locking device 75, such as a latch is disposed relative to a power supply 80 as opposed to a torch. The locking device 75 can be a hooking device or a latch disposed relative to a housing 20' for a corresponding connector assembly 10'. The connector assembly 5' of the thermal cutting system or welding system can include a stationary receiving mechanism 76 such as a groove or a channel that allows the locking device 75 (e.g., hooking device or latch) to engage with the stationary receiving mechanism 76. In some embodiments, the connector assembly 5' associated with the thermal cutting system or welding system includes a spring 85 which is compressed upon engagement with the corresponding connector assembly 10'. In this embodiment, application of a force on the contact member 40' causes disengagement of the locking device 75 and/or latch from the housing 20', the spring 85 causing the connector assembly 5' of the thermal cutting system or welding system to eject out upon the release or disengagement of the latch. In this embodiment, the connector assembly 5' is disposed relative to a torch for a thermal cutting system or welding system. In some embodiments, the connector assembly 5' is disposed relative to power and/or gas supply.

Figure 5A:
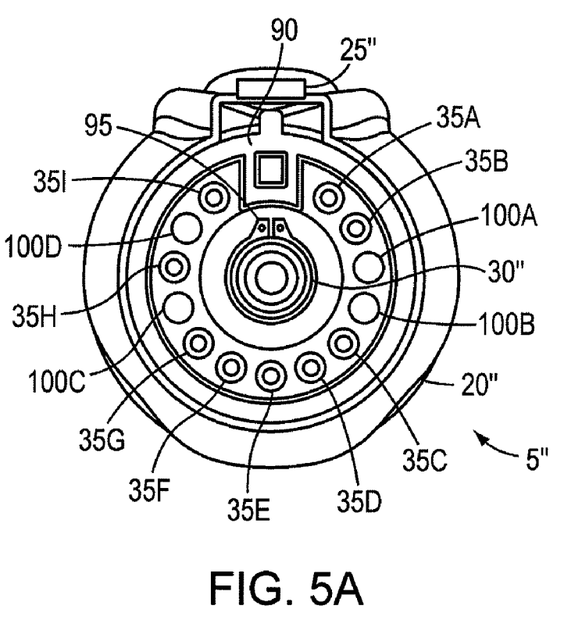
FIG. 5A shows an end view of a connector assembly, according to an another illustrative embodiment.

FIG. 5A illustrates of an end view of a connector assembly 5", according to an illustrative embodiment. In some embodiments, the connector assembly 5" of FIG. 5A can be associated with one end of a thermal cutting system or welding system, such as a lead for a plasma arc torch or welding apparatus. In some embodiments, connector assembly 5" can be disposed relative to a power and/or gas supply. In some embodiments, the connector assembly 5" includes a plurality of current carrying members 35A-I disposed radially relative to the conduit 30". The connector assembly 5" also can include a mechanical lockout feature 90 adapted to mate with a corresponding feature on a corresponding connector assembly (see FIG. 5B).

In some embodiments, the conduit 30" is made out of brass or copper to conduct both gas, through the center (e.g., sealed with radial o-ring), and main power current (e.g., 30-100 A+), through the slotted tangs 95. Current carrying members 35A-I can be disposed radially relative to the conduit 30" and can be, by way of example, are signal pins or operational pins. Members 35A-I can carry a signal current and/or an operational current to the thermal cutting system or welding system. The operational circuit can be a pilot current sent to a plasma arc torch. In some embodiments, current carrying members 35A-I are spaced at least a mandated clearance and creepage distance away from the conduit 30". The two current carrying members 35A-B can carry pilot current while other current carrying members (e.g., 35C-I) can carry signal current. Empty holes 100A-D can be disposed between the pilot current carrying members 35A-B and signal current carrying members 35C-I for sufficient creepage and/or clearance.

As depicted in FIG. 5A, the connector assembly 5" can be a first end of an adaptor for the thermal cutting system or welding system. The first end can be configured to slideably lock and/or engage with a corresponding connector assembly that can be disposed relative to a power supply. In some embodiments, where the connector assembly 5" is an adaptor, the adaptor can include a second end (not shown) that is configured to mate with a torch for a plasma arc torch system or a welding apparatus. For example, if a torch has a threaded connecting mechanism, the second end of the adaptor (not shown) can have a threaded passage configured to mate with the torch, allowing the torch to connect to a power supply having a corresponding connector assembly configured to receive and/or mate with the first end of the connector assembly 5" as shown in FIG. 5A. It is contemplated that adaptors for connector assemblies as described in FIGS. 1-4B and 6 can be used to connect a torch to a corresponding connector assembly disposed relative to a power and/or gas supply.

In some embodiments, the connector assembly 5" includes a housing 20" (e.g., housing wall). FIG. 5A shows an end face of the connector assembly 5" disposed relative to the housing 20". The housing 20" can have a longitudinal axis along the x-axis. In some embodiments, the locking device 25" (e.g., locking mechanism) can extend from the housing 20". In some embodiments, the locking device 35" extends from an external surface of the housing 20". In some embodiments, the locking mechanism 25" can extend orthogonally or radially from the longitudinal axis. At least one of the conduit 30" (e.g., gas carrying member), current carrying member 35A, 35B, or 35C can extend from an end face disposed relative to the housing 20". In some embodiments, a current carrying member 35A, 35B or 35C can be a signal carrying member. In some embodiments, the connector assembly 5" can include an alignment feature orienting the connector relative to a corresponding connector assembly (e.g., corresponding receiving connector).

Figure 5B:
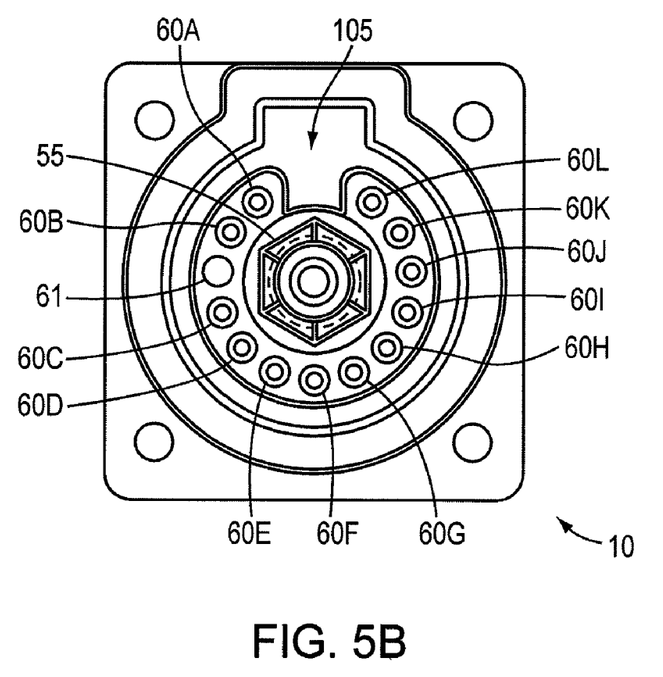
FIG. 5B shows an end view of a corresponding connector assembly configured to mate with the connector assembly of FIG. 5A.

FIG. 5B shows a drawing of an end view of a corresponding connector assembly 10 configured to mate with the connector assembly 5" of FIG. 5A. The corresponding connector assembly 10 of FIG. 5B can be a socket adapted to mate with the connector assembly 5" of FIG. 5A. In some embodiments, the corresponding connector assembly 10 is disposed relative to a power and/or gas supply or relative to a torch for a thermal cutting system or welding system. The corresponding connector assembly 10 includes a feature 55 (e.g., a passage) configured to carry at least one of a gas and/or a current that mates with the conduit 30" in the connector assembly 5" of FIG. 5A. The corresponding connector assembly 10 can also include a plurality of features 60A-L (e.g., sockets) or 61. Features 60A-L can be configured to carry a current and mate with the current carrying members 35A-I in the connector assembly 5" of FIG. 5A. The corresponding connector assembly 10 also can include a feature 105 adapted to mate with the mechanical lockout feature 90 in the connector assembly 5" of FIG. 5A.

Figure 6:
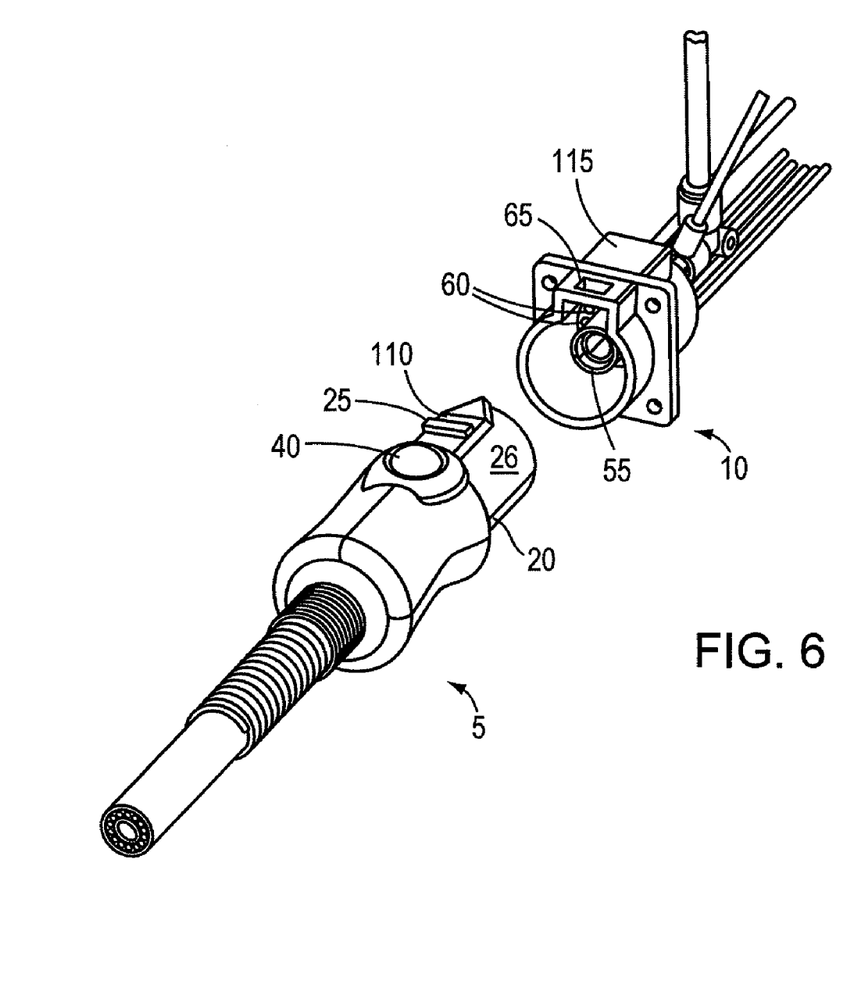
FIG. 6 is a drawing of a connector assembly and a corresponding connector assembly, according to another illustrative embodiment.

FIG. 6 is a drawing of an external view of a connector assembly 5 associated with a thermal cutting system or welding system and a corresponding connector assembly 10, according to an illustrative embodiment. In some embodiments, the connector assembly 5 is associated with a power supply and a corresponding connector assembly 10 is associated with a torch for a thermal cutting system or welding system. In some embodiments, the connector assembly 5 has a key shaped feature 110 disposed relative to or on the housing 20. The corresponding connector assembly 10 can have a corresponding feature 115 (e.g., corresponding key shaped feature) that is adapted to mate with the key shaped feature 110 of the connector assembly 5. The key shaped feature 110 can be alignment geometry on the housing 20 of the connector assembly 5 that can allow the user to correctly align or orient the connector assembly 5 during engagement. In this embodiment, the key shaped feature 110 is shaped as an arrow. Other alignment features may also be incorporated. In some embodiments, the key shaped feature 110 is a polygonal shape. For example, the shape of the housing 20 may be selected so that it properly orients all of the members, such a polygonal shape or and oval shape. In some embodiments, the general orientation of the conduit 30 or the current carrying members 35A, 35B, or 35C can be used to align the connector assembly 5.

In some embodiments, a cavity is formed in this key shaped feature 110 to house a locking device 25, such as a latching feature and a resilient member. The corresponding connector assembly 10 can be a generally round socket that includes a corresponding key shaped feature 115 for alignment purposes. The top of the key shaped feature 115 in the corresponding connector assembly 10 can have a stationary receiving mechanism 65, such as a hole feature, for receiving the locking device 25 or a latching feature in the connector assembly 5.

In some embodiments the contact member 40 is a button. The contact member 40 or button can be depressed by a user to manipulate the latch. Additionally, the button, latch, and key shaped feature can be intuitive. The key shaped feature 110 and button can form the shape of an arrow, which can intuitively show this-way-up and this-way-in. In this embodiment, the key shaped feature 110 is arrow shaped key feature that also acts to center the key shaped feature 110 with a corresponding shaped feature 115 and allow a larger range of alignment angles between the two respective parts 110, 115. The button also can have a push-me appearance. The key shaped feature and the button can be desirable over other connecting configurations, such as a nut coupling that often requires two hands, one to align and push the plug and the other to screw the nut and engage the threads. Often the existing designs are not intuitive and require trial and error in alignment or connecting. Existing designs can also take longer, anywhere from two to 20 times in actual tests.

FIG. 6 further illustrates the compact size of the connector assembly 5, according to an illustrative embodiment. In an embodiment where the connector assembly 5 is on the torch, the locking mechanism 25 is located on the housing wall 26 and is oriented radially outward from the center of the housing 20. The different operational members, including the gas conveyance member, the current conveyance member, and the signal conveyance member (not shown) are located within a generally circular the housing wall 26. This outward orientation of the locking mechanism 25 and the inwardly located operational members, relative to the housing wall 26, allow the connector assembly 5 to be coupled to the inside of the corresponding connector assembly 10. As such, the connector assembly 5 is very compact and only requires a limited receiving space on the power supply for the corresponding connector assembly 10. Referring back to FIG. 5A, this drawing further demonstrates the compact feature of the connector assembly 5. In the embodiment depicted, the conduit 30 is centrally located with a round housing wall 26. As seen from and end view, in this embodiment, the signal members 35A-I are located radially outward from the conduit 30 and between the conduit 30 and the housing wall 26. In this embodiment, only the locking mechanism 25 and the key shaped feature 115 are located radially outward of the housing wall 26.

Figure 7:
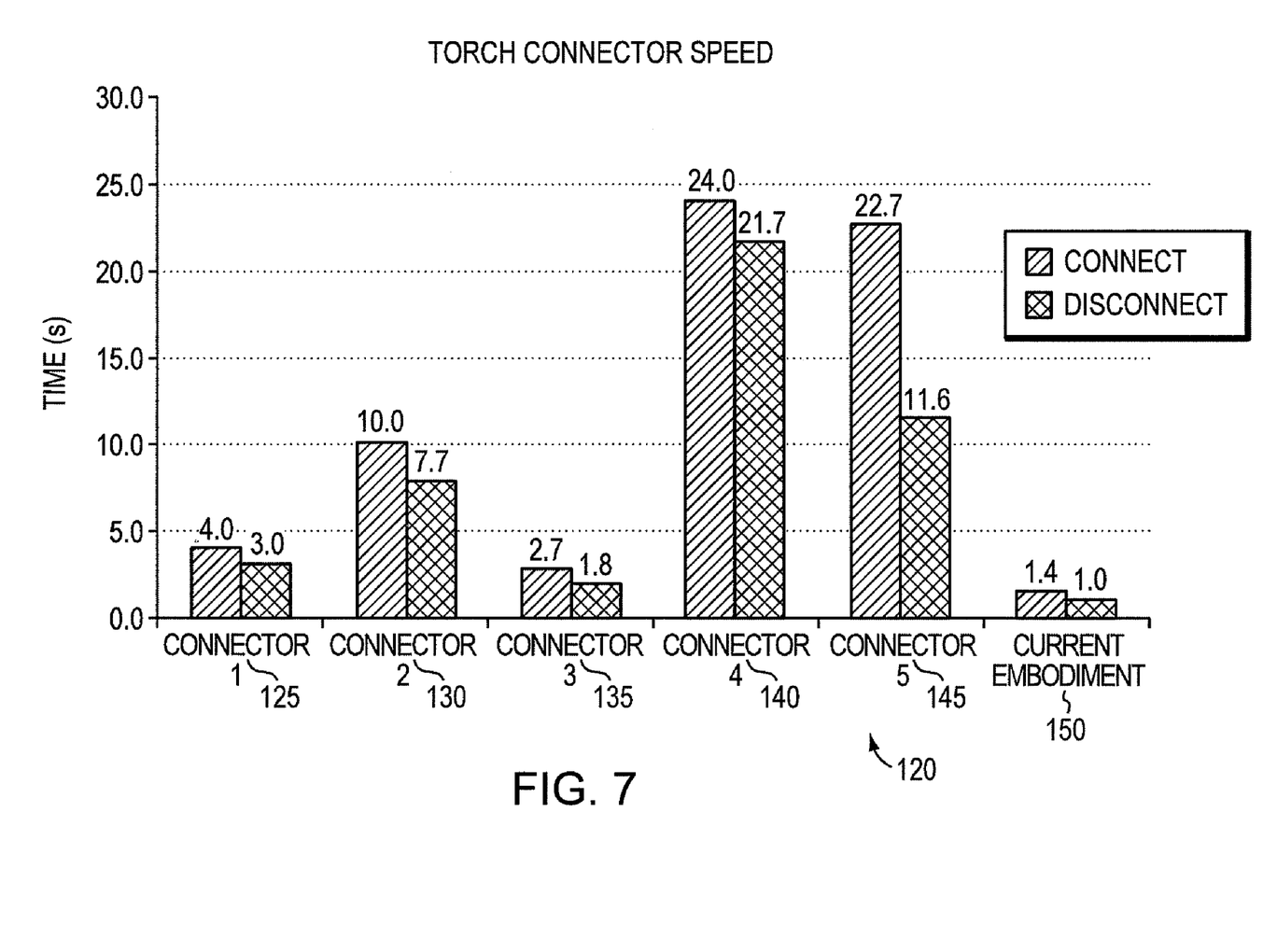
FIG. 7 is a graph comparing torch connector speeds for different connector assemblies with the connector speed of a connecting assembly according to an illustrative embodiment.

FIG. 7 is a graph comparing a torch connector speed for various connector assemblies. The graph 120 compares the time taken to connect and disconnect various connector assemblies from a corresponding connector assembly. "Connector 1" 125 is made with off the shelf pneumatic and signal components contained in a bulky overmolded package. It also contains a ¼ turn rod which helps retain the bottom half of the connector. As shown in FIG. 7, the time taken to connect using Connector 1 was 4 seconds and the time taken to disconnect was 3 seconds. "Connector 2" 130 utilizes a fine threaded nut coupler. As shown in FIG. 7, the time taken to connect using Connector 2 was 10 sections and the time taken to disconnect was 7.7 seconds. "Connector 3" 135 utilizes a coarse threaded nut coupler. As shown in FIG. 7, the time taken to connect using Connector 3 was 2.7 seconds and the time taken to disconnect was 1.8 seconds. "Connector 4" 140 utilizes a fine threaded nut coupler and is also hard to align. As shown in FIG. 7, the time taken to connect using Connector 4 was 24 seconds and the time taken to disconnect was 21.7 seconds. "Connector 5" 145 utilizes off the shelf pneumatic and signal components and is accessed through a door in the power supply. As shown in FIG. 7, the time taken to connect using Connector 5 was 22.7 seconds and the time taken to disconnect was 11.6 seconds. The connector entitled "Current Embodiment" 150 is a connector assembly as described in FIGS. 3A-3B. As shown in FIG. 7, the time taken to connect using the Current Embodiment of FIGS. 3A-3B was 1.4 seconds and the time to disconnect was 1 second. FIG. 7 demonstrates that the embodiment of the connector assembly 150 as described in FIGS. 3A-3B, has a quicker connecting and disconnecting time as compared to the other connector assemblies 125-145.

Figure 8A:
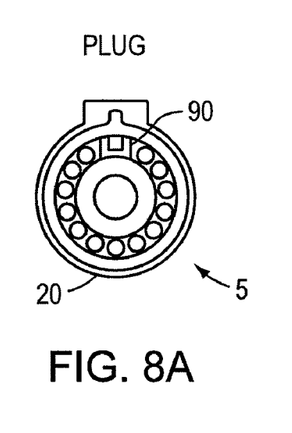
FIG. 8A shows a connector assembly including a mechanical lockout feature, according to an illustrative embodiment.
Figure 8B:
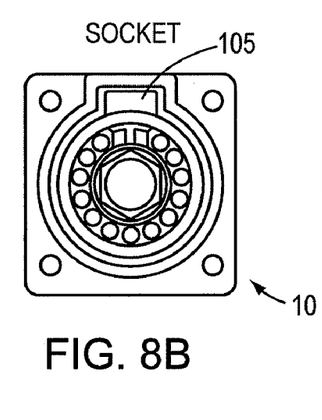
FIG. 8B shows a corresponding connector assembly including a corresponding mechanical lockout feature, according to an illustrative embodiment.
Figure 8C:
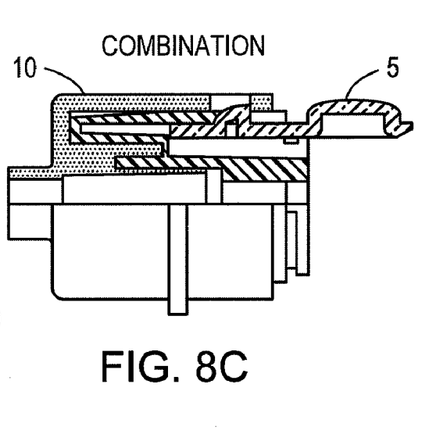
FIG. 8C shows the connector assembly of FIG. 8A engaged with the corresponding connector assembly of FIG. 8B, according to an illustrative embodiment.

FIG. 8A is a drawing depicting a mechanical lockout feature 90 according to an illustrative embodiment. The lockout feature 90 prevents incorrectly sized, or insufficiently sized, torches from being connected to power supplies of a different power rating. In some embodiments, the connector assembly 5 is a plug that includes a mechanical lockout feature 90 disposed relative to the housing 20. FIG. 8B shows a corresponding connector assembly 10 can be a socket that can have a corresponding mechanical lockout feature 105 which can, depending on the shape of the feature, mate with the mechanical lockout feature 90 of the connector assembly 5. FIG. 8C shows the corresponding connector assembly 10 engaged with the connector assembly 5, wherein the corresponding mechanical lockout feature 105 mates with the mechanical lockout feature 90.

In some embodiments, the connector assembly 5 is disposed relative to a plasma arc torch and the corresponding connector assembly 10 is disposed relative to a power and/or gas supply. The mechanical lockout feature 90 can be an adjustable feature that can be adjustable in the mold. In some embodiments, the mechanical lockout feature 90 is used to ensure that a plasma arc torch with a specific amperage cannot mate with a power supply having of a higher amperage. By way of example only, the mechanical lockout feature 90 disposed on torch can only mate with a corresponding mechanical feature 105 on a power and/or gas supply if the corresponding mechanical feature 105 has a compatible shape that permits mating to occur between the mechanical lockout feature 90 and the corresponding feature 105. For example, the mechanical lockout feature 90 on both a plug of torch and the feature 105 on a receptacle on a power supply can prevent lower amperage torches from going onto higher amperage machines.

Figure 8D:
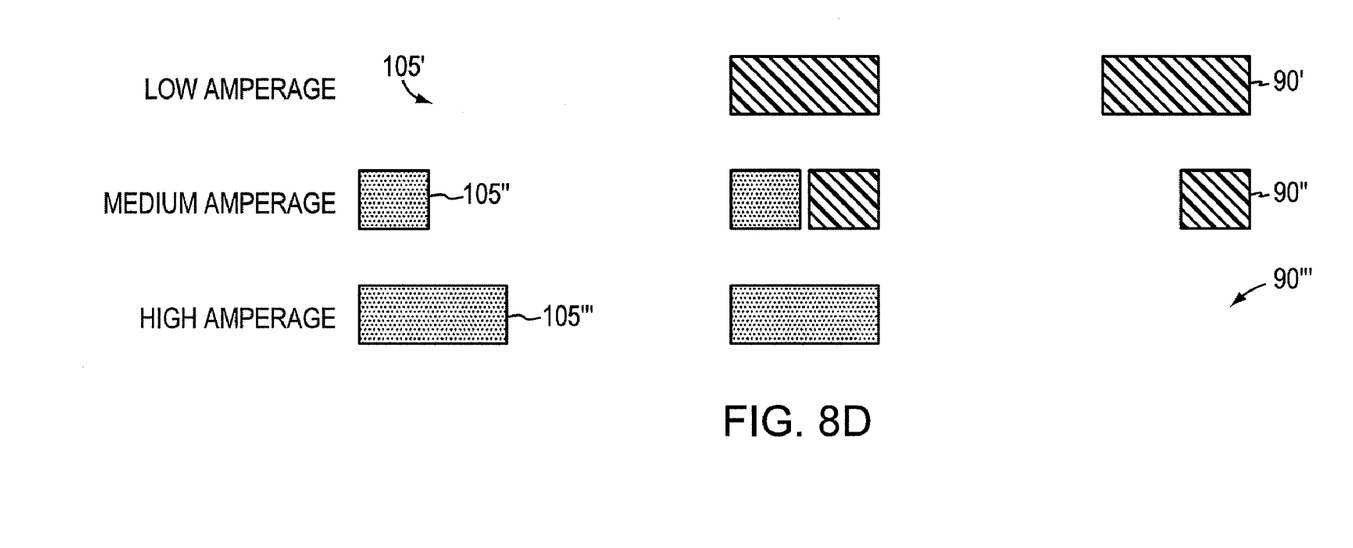
FIG. 8D shows the compatibility of a mechanical lockout feature with a corresponding mechanical lockout feature, according to an illustrative embodiment.

For example, as shown in FIG. 8D, a plug (e.g., as shown in FIG. 8A) having a low amperage can have a mechanical lockout feature 90' (e.g., a protrusion), a plug having a medium amperage can have a mechanical lockout feature 90", and a plug having a high amperage can have a mechanical lockout feature 90'". For embodiments in which the socket supplies the power, a socket (e.g., the socket of FIG. 8B) having a low amperage can have a corresponding mechanical lockout feature 105' (e.g., another protrusion) which can mate with plugs having a low amperage feature 90', medium amperage feature 90" or high amperage feature 90'", respectively. A socket having a medium amperage can have a mechanical lockout feature 105" which can mate with plugs having a medium amperage 90" or high amperage 90'" but whose lockout feature cannot mate with a plug having a low amperage 90'. A socket having a high amperage can have a mechanical lockout feature 105'" which can mate with plugs having a high amperage 90'" but whose lockout feature cannot mate with a plug having a low amperage 90' or a medium amperage 90". For example, a mechanical lockout feature 90 can allow a 40A plug to fit into a 40A socket but no other, whereas a 100A plug plugs into a 40A or 100A socket, thus preventing connecting arrangements between a plug and socket that can result in equipment damage or injury to personnel.

While the invention has been particularly shown and described with reference to specific illustrative embodiments, it should be understood that various changes in form and detail may be made without departing from the spirit and scope of the invention.

What is claimed is:

1. A connector assembly for a thermal cutting system or welding system comprising:
   a housing including a locking device;
      the locking device causing, upon application of a translational force, engagement of the connector assembly relative to a stationary receiving mechanism;
      the locking device causing, upon application of a force on a contact member or a rotational moment on the contact member, disengagement of the locking device relative to the stationary receiving mechanism;
   a central conduit disposed in the housing, the central conduit configured to carry a gas and a torch current to the thermal cutting system or welding system; and
   a plurality of current carrying members disposed radially relative to the central conduit,
      wherein at least one current carrying member is configured to carry a pilot current.

2. The assembly of claim 1 further comprising a corresponding connector assembly disposed on a power supply for mating with the connector assembly, the corresponding connector comprising:
   the stationary receiving mechanism;
   a passage configured to carry the gas from the power supply to the thermal cutting system or welding system; and
   a plurality of sockets each configured to carry a current and mate with the plurality of current carrying members.

3. The assembly of claim 1 wherein the connector assembly is disposed on a plasma arc torch.

4. The assembly of claim 1 wherein the connector assembly is disposed on a power supply.

5. The assembly of claim 1 wherein the thermal cutting system or welding system is a plasma system.

6. The assembly of claim 1 wherein one of the plurality of current carrying members is configured to carry a cutting current for a plasma arc torch system.

7. The assembly of claim 1 wherein the locking device is a resilient latch.

8. The assembly of claim 7, the resilient latch causing, upon application of a translational force, engagement relative to the stationary receiving mechanism.

9. The assembly of claim 8 wherein the contact member is associated with the connector assembly and is in mechanical communication with the resilient latch, the contact member causing, upon application of a force, disengagement of the resilient latch with the stationary receiving mechanism.

10. The assembly of claim 1 further comprising a mechanical lockout feature disposed relative to the housing.

11. The assembly of claim 10 further comprising a second mechanical lockout feature configured to mate with the mechanical lockout feature disposed relative to the housing.

12. The assembly of claim 1 further comprising a key shaped feature disposed relative to the housing.

13. The assembly of claim 12 further comprising a second key shaped feature disposed relative to a corresponding connector assembly, the second key shaped feature configured to mate with the key shaped feature disposed relative to the housing.

14. The assembly of claim 1 wherein the connector assembly is an adaptor for connecting a plasma arc torch to the stationary receiving mechanism, the stationary receiving mechanism disposed relative to a power supply and the housing of the connector assembly comprises:
   a first end including the locking device; and
   a second end capable of mating with the plasma arc torch.

15. The assembly of claim 1 wherein one of the plurality of current carrying members is configured to carry a cutting current or a welding current.

16. A method of connecting a connector to a power supply, the method comprising:
   providing the connector assembly of claim 1; and
   engaging the connector assembly with the stationary receiving mechanism, wherein the stationary receiving mechanism is disposed relative to the power supply.

17. The connector assembly of claim 1, wherein the locking device causes, upon application of a translational force and absent a rotational force, engagement of the connector assembly relative to the stationary receiving mechanism.

18. The connector assembly of claim 1, further comprising at least one hole disposed between and providing electrical clearance between the current carrying members.

19. A plasma torch connector for a plasma arc torch comprising:
   a housing wall;
   a locking mechanism extending from the housing wall;
   a central conduit extending from an end face of the connector and centrally disposed relative to the housing wall, the central conduit configured to carry a gas and a torch current to the plasma arc torch,
   a plurality of current carrying members extending from the end face and disposed radially relative to the central conduit, wherein at least one current carrying member is configured to carry a pilot current; and
   an alignment feature orienting the connector relative to a corresponding receiving connector.

20. The connector of claim 19 wherein the locking mechanism extends orthogonally from a longitudinal axis of the housing wall.

21. The connector of claim 19 wherein the locking mechanism extends radially from a longitudinal axis of the housing wall.

22. The connector of claim 19 wherein:
   the housing wall is substantially circular; and
   the alignment feature is a key shaped feature on the housing wall.

23. The connector assembly of claim 19 further comprising a lockout feature.

24. A connector for a torch comprising:
- a supportive structure;
- a central conduit disposed in the supportive structure and adapted to carry a gas and a current to the torch;
- a plurality of current carrying means disposed radially relative to the central conduit and for carrying at least one of a pilot current or a signal current;
- a means for slideably locking the supportive structure to a corresponding receiving means; and
- a means for disengaging the supportive structure to the corresponding receiving means.

25. A plasma torch connector for a plasma arc torch comprising:
- a housing wall;
- a locking mechanism extending from an external surface of the housing wall;
- a central conduit extending from an end face of the connector and centrally disposed relative to the housing wall, the central conduit configured to carry a gas and a torch current to the plasma arc torch;
- a plurality of current carrying members extending from the end face and disposed radially relative to the central conduit, wherein at least one current carrying member is configured to carry a pilot current; and
- an alignment feature orienting the connector relative to a corresponding receiving connector.

26. A connector for a torch comprising:
- a supportive structure;
- a conduit disposed in the supportive structure and adapted to carry a gas to the torch;
- a means for carrying a cutting current to the torch;
- a means for carrying at least one of a pilot current or a signal current;
- a means for slideably locking the supportive structure to a corresponding receiving means;
- a means for disengaging the supportive structure to the corresponding receiving means; and
- a means for locking out torches having improper power capacities.

27. A connector device for a plasma arc torch system comprising:
- a housing comprising a means for locking out differently rated torches;
- a conduit disposed in the housing, the conduit carrying at least one of a gas or a current to the plasma arc torch system; and
- a pin disposed relative to the conduit, the pin carrying a second current to the plasma arc torch system.

28. The connector device of claim 27 wherein the means for locking out differently rates torches is a molded feature having a length that correlates to a selected current rating.

29. A connector assembly for a thermal cutting system or welding system comprising:
- a housing including a locking device, wherein the locking device is a pin or a latch;
  - the locking device causing, upon application of a translational force, engagement of the connector assembly by engaging the locking device with a notch feature adapted to receive the locking device;
  - the locking device causing, upon application of a force on a contact member or a rotational moment on the contact member, disengagement of the locking device relative to the notch feature;
- a central conduit disposed in the housing, the central conduit configured to carry a gas and a torch current to the thermal cutting system or welding system; and
- a plurality of current carrying pins disposed radially relative to the central conduit, wherein the plurality of current carrying pins includes at least one current carrying pin configured to carry a pilot current.

* * * * *